C. L. SCHWARTZ.
CAR BOLSTER SIDE BEARING.
APPLICATION FILED JAN. 31, 1910.
974,832.
Patented Nov. 8, 1910.
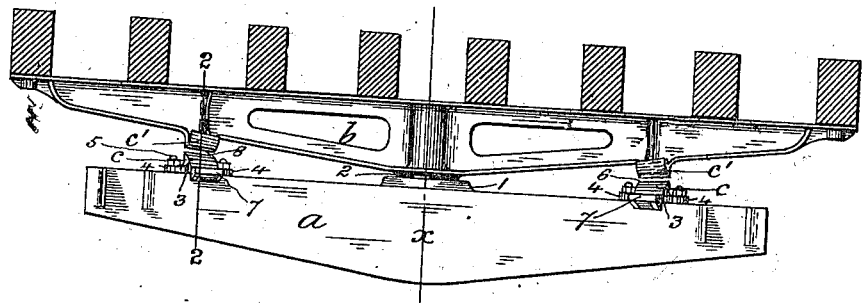
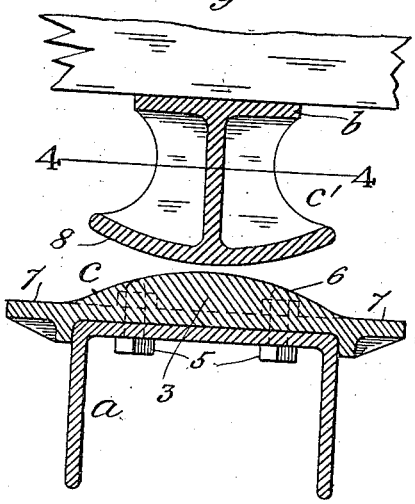
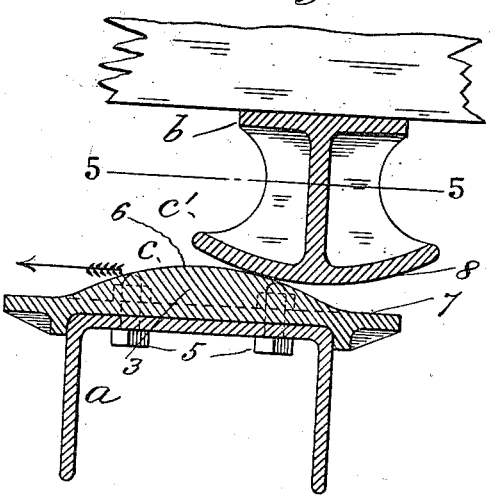
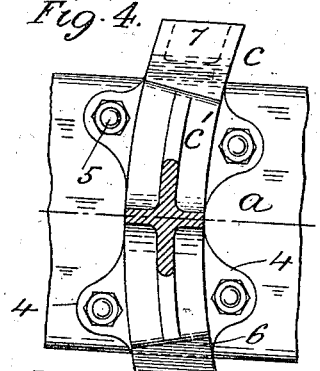
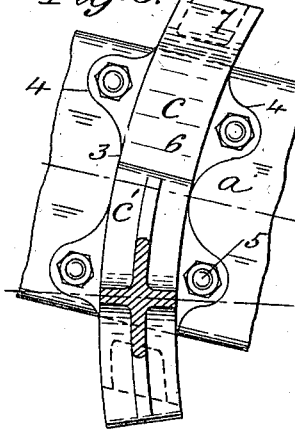
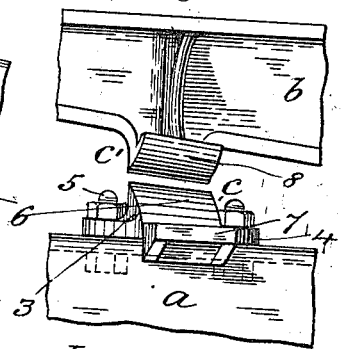
INVENTOR
Carl L. Schwartz
By Edward W. Furrell
His Atty

UNITED STATES PATENT OFFICE.

CARL L. SCHWARTZ, OF ST. LOUIS, MISSOURI.

CAR-BOLSTER SIDE BEARING.

974,832.  Specification of Letters Patent.  Patented Nov. 8, 1910.

Application filed January 31, 1910. Serial No. 541,122.

*To all whom it may concern:*

Be it known that I, CARL L. SCHWARTZ, a citizen of the United States, residing at St. Louis, in the State of Missouri, have invented a new and useful Improvement in Car-Bolster Side Bearings, of which the following is a specification.

My invention relates to car side-bearings, and has for its object to gradually limit the sway of the car body due to the horizontally acting centrifugal force when the truck is rounding a curve, by maintaining the engagement initially produced, of the body side-bearing with the truck side-bearing during the pivotal movement of the truck about the king-pin from its normal position in alinement with the body-bolster to its maximum inclination thereto in either direction without sudden and undue impact on the truck-bolster and compression of the bolster-springs, which occurs with the ordinary side-bearings, and to utilize the engaging force produced by the weight of the car body, in assisting the truck to travel more freely around the curve in the direction of the pressure on the side-bearings.

The invention consists in features of novelty as hereinafter described and claimed, reference being had to the accompanying drawing forming part of this specification, whereon, Figure 1, is a side elevation of a metallic body-bolster and combined truck-bolster having my improved side-bearings applied thereto; Fig. 2, a vertical transverse section to enlarged scale through the bolsters and corresponding longitudinal section through the side-bearings, on line 2, 2, in Fig. 1, showing the bolsters in central vertical alinement when the truck is on a straight track; Fig. 3, a similar view to Fig. 2, showing the relative positions of the side-bearings on the pivotal movement of the truck-bolster about the king-pin in the direction indicated by the arrow, when the truck is on a curve; Fig. 4, a horizontal section to enlarged scale, through the body side-bearing, on line 4, 4, in Fig. 2, showing the truck side-bearing and its attachment to the truck-bolster (broken away) in top plan view; Fig. 5, a similar view to Fig. 4, on line 5, 5, in Fig. 3, and Fig. 6, an end view of the side-bearings corresponding to their positions seen in Figs. 2 and 4, and a side elevation of the adjacent parts of the bolsters.

Like letters and numerals of reference denote like parts in all the figures.

$a$ represents a preferably metallic truck-bolster, and $b$ the combined body-bolster of a railroad car, the bolsters $a$ and $b$ having the engaging center-plates 1 and 2 respectively, and pivotal about the king-pin (not shown) in the usual well-known manner.

Projecting from the bolsters $a$ and $b$ at the usual distance along the same on each side of their pivotal center $x$, are the truck and body side-bearings $c$ and $c'$ respectively, each truck side-bearing $c$, according to my invention, consisting of a block or projection 3 of suitable height which is preferably composed of cast steel and arranged longitudinally across the top of the truck-bolster $a$, the block 3 having its inner and outer sides preferably radial to the pivotal center $x$ of the bolsters $a$ and $b$ and formed at the bottom with outwardly projecting lugs 4 which are perforated vertically for the passage preferably, of bolts 5 whereby the block 3 is firmly fixed to the truck-bolster $a$ at the top as shown. Or the block 3 may be flanged at the bottom and riveted therethrough to the bolster $a$, or may be integral with the latter as found most desirable.

The block 3 is formed or provided at the top with a longitudinally inclined, preferably convex, bearing-face 6 having its apex coincident with the longitudinal center of the truck-bolster $a$, the bearing-face 6 being preferably, a circular arc, and transversely inclined downward from the outer side of the block 3 radially to the pivotal support of the body-bolster $b$ on the truck-bolster $a$, or thereabout, and the block 3 preferably overlapping the sides of the truck-bolster $a$ and formed at each end beyond the bearing-face 6 with a horizontal bearing portion 7 for the purpose hereinafter particularly specified.

The body side-bearing $c'$, which in the present case is formed by a dependent portion of the body-bolster $b$, is formed at the bottom with a longitudinally inclined, preferably convex, bearing-face 8 which is similarly inclined transversely, and adapted to engage the bearing-face 6 of the truck side-bearing $c$, the bearing-face 8 having preferably, a corresponding radius or curvature to, and its apex coincident with and preferably clear of, the apex of the bearing-face 6 of the truck-bolster $a$ in the normal positions of the bolsters $a$ and $b$.

In operation, on the movement of the truck-bolster $a$ about its pivotal center $x$ when the truck is rounding a curve in either direction, in the present case in that indicated by the arrow in Fig. 3, the bearing-face 8 of the body side-bearing $c'$, after its initial contact with the bearing-face 6 of the truck-bolster $a$, consequent on the sway of the car body due to the horizontally acting centrifugal force on the truck leaving its normal position, will descend the inclined bearing-face 6 on the diverging side of its apex from the body-bolster $b$, and in so doing retard the sway of the car body, while maintaining its engagement with the bearing-face 6, and the resultant pressure of this engagement due to the weight of the car body combined with the wedge action of the practically sloping contact surfaces, will operate to force the truck in the direction of, and enable it to travel around the curve more freely than with the ordinary side-bearings; while the terminal horizontal bearing portions 7 of the truck side-bearing $c$ will operate to prevent excessive vertical clearance between the side-bearings $c$ and $c'$, in case of abnormal pivotal movement of the truck.

What I claim as my invention and desire to secure by Letters Patent is:—

1. A car side-bearing having a bearing-face longitudinally inclined from its apex in opposite directions, and inclined transversely.

2. A car side-bearing having a bearing-face longitudinally inclined from its apex in opposite directions, and terminating in horizontal portions.

3. A car side-bearing having a bearing-face longitudinally inclined from its apex in opposite directions, the said face terminating in horizontal portions inclined therewith transversely.

4. A car side-bearing having a bearing-face longitudinally inclined from its apex in opposite directions, the said face terminating in horizontal portions radial therewith to the pivotal center of the car-truck.

CARL L. SCHWARTZ.

Witnesses:
HAL C. BELLVILLE,
C. T. WESTLAKE.